Feb. 20, 1951 P. G. EDWARDS 2,542,183

TRANSMISSION PRIVACY SYNCHRONIZING AND EQUALIZING SYSTEM

Filed July 10, 1948 3 Sheets-Sheet 1

INVENTOR
P. G. EDWARDS
BY H. A. Burgess
ATTORNEY

Feb. 20, 1951 P. G. EDWARDS 2,542,183

TRANSMISSION PRIVACY SYNCHRONIZING AND EQUALIZING SYSTEM

Filed July 10, 1948 3 Sheets-Sheet 2

INVENTOR
P. G. EDWARDS
BY H. A. Burgess
ATTORNEY

TRANSMISSION PRIVACY SYNCHRONIZING AND EQUALIZING SYSTEM

Filed July 10, 1948 3 Sheets-Sheet 3

INVENTOR
P. G. EDWARDS
BY H. J. Burgess
ATTORNEY

Patented Feb. 20, 1951

2,542,183

UNITED STATES PATENT OFFICE 2,542,183

TRANSMISSION PRIVACY SYNCHRONIZING AND EQUALIZING SYSTEM

Paul G. Edwards, Verona, N. J., assignor to Bell Telephone Laboratories, Incorporated, New York, N. Y., a corporation of New York Application July 10, 1948, Serial No. 38,115

10 Claims. (Cl. 179—15)

This invention relates to a multichannel communication system, and separately or in combination, to the synchronization of transmitting and receiving channel switching for privacy purposes, and to the equalization of frequency distortion due to selective fading effects in the transmission path between the transmitting and receiving ends or stations of the system.

Heretofore, where there has been need for synchronizing the channel switching, in a privacy communication system, at the receiving end or terminal with the channel switching at the transmitting end or terminal, a separate control frequency has been used for the purpose and placed adjacent to the normal speech or other signal band, thus occupying valuable frequency space. Likewise, separate pilot tones which occupied valuable space in the frequency spectrum have been used for equalization purposes. These synchronizing and equalizing frequencies have generally been separated from the intelligence channels by means of filters at the receiving end of the system. For a given frequency band width assignment, any frequency space devoted to synchronization and equalization tones is lost for use in the transmission of intelligence.

An object of this invention is to synchronize the privacy switching at the receiving end with that at the transmitting end, in a multichannel communication system, without sacrifice of the frequency space desired or required to be used for the message frequency band or bands.

Another object of the invention is to equalize or compensate for frequency distortion, in the transmitted and received intelligence, due to selective fading in the transmission path between the transmitting and receiving stations or terminals of a multichannel communication system, in a manner that does not require sacrifice or loss of frequency space desired or required for the message frequency band or bands.

One feature of this invention is that all intelligence or message channels are opened or interrupted simultaneously for a time interval sufficient to permit a synchronizing pulse to be transmitted over the channels in the interval, but not sufficient to introduce any noticeable effect on the message or messages being transmitted.

Another feature is that the pulse so transmitted may be comprised of several frequencies spaced within the message frequency band of the particular multichannel frequency system, so as to provide frequency diversity, thus minimizing the possibility of losing in transmission a synchronizing pulse as a result of selective fading conditions that might prevail in the transmission medium.

Still another feature of the invention lies in the fact that such a multifrequency pulse provides a plurality of pilot tones affording indications of the instantaneous selective fading characteristics of the transmission path or medium, that may be utilized to effect appropriate equalization or compensation at the receiving end or terminal of the system.

Another feature of the invention involves the inclusion in the communication system of multifrequency equalizers reacting to a pulse of short duration and holding their adjustment during the time interval between pulses.

In accordance with the invention, there is provided a multichannel transmission system which utilizes privacy switching at transmitting and receiving ends or terminals thereof, whereby the individual message circuits are switched among the various channels of the system in a desired preassigned manner.

The transmission system involves the connecting of a selected number of speech message circuits or stations at one end or terminal of the system with a like number of message circuits or stations at the other end or terminal of the system, over, for example, a radio frequency transmission medium. The message frequency bandwidths of all message circuits are preferably the same. A number of radio frequency transmission channels equal to that of the message circuits at each terminal may be employed, the channels being of equal frequency bandwidth and of the same bandwidth as that of the message circuits. The message or intelligence frequency band in a message circuit at the transmitting terminal may be inverted and shifted in the frequency spectrum prior to radio transmission, and, from one switching interval to another, may occupy any one of two upper and two lower sideband positions with respect to the radio frequency or carrier wave on which the message bands are modulated prior to transmission over the radio frequency medium. At the receiving end, the received sideband products of modulation are detected, and the inverted and shifted message bands are appropriately reinverted and reshifted prior to delivery to the message circuits at the receiving terminal. The switching at each end of the system is controlled by means of pulses derived from local oscillators or periodic elements through multivibrators and frequency dividers. To synchronize the oscillators and, hence, the switching at the receiving terminal with the switching at the transmitting terminal, all channels of the system are interrupted at the transmitting terminal for a brief interval of time, and during this time a multifrequency pulse which is timed by the local oscillator is transmitted. At the receiving terminal, the incoming channels are interrupted substantially in synchronism with the interruptions at the transmitting terminal, under control of the local oscillator.

The received multifrequency pulse is rectified and compared with a pulse which is generated locally under control of the local oscillator. This comparison is on a time of inception basis and, depending upon whether the locally generated pulse has its time of inception before or after the time of inception of the received pulse, the local oscillator is slowed down or speeded up as required to bring the local oscillators at both ends of the system into substantial synchronism.

In accordance with the invention, there is further provided a radio transmission system including selective fading equalization means involving an equalizer for each channel, each of which is adjusted automatically in accordance with the received relative amplitude of the various frequencies which comprise the synchronizing pulse. The individual frequencies which comprise the pulse are spaced out over the speech or other message frequency band, and are of equal amplitudes when transmitted. These individual frequency components of the pulse act therefore as pilot tones; and the relative amplitudes of the tones, which constitute the pulse, as received at the receiving terminal of the system, give a measure of the selective fading conditions of the transmission medium during the time of transmission of the pulse. Equalizers responsive to these variations in level and arranged to react on a pulse of limited duration, and to hold their adjustment between pulses, are used to provide automatic selective fading equalization.

A more complete understanding of this invention, its objects, features and the mode of operation, will be derived from the detailed description that follows, read with reference to the appended drawings wherein.

Figure 2:
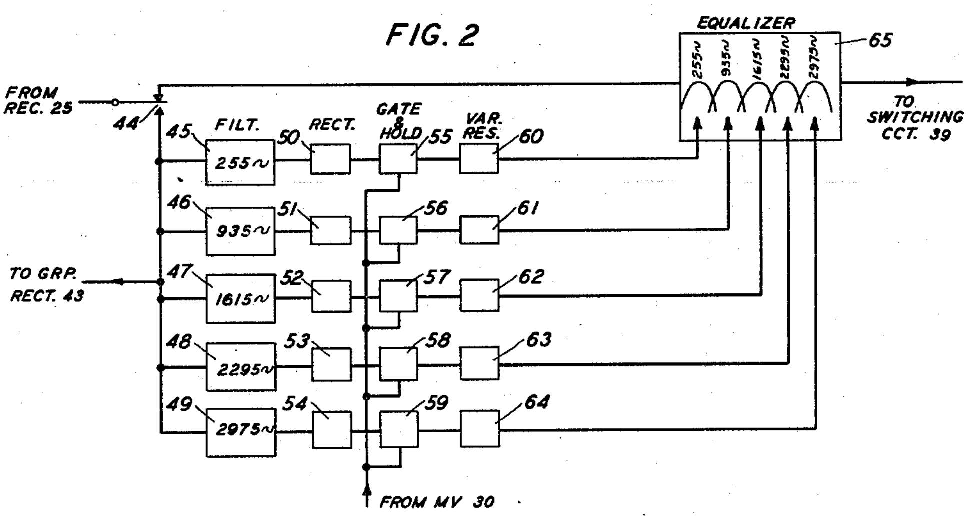
Fig. 2 shows the detailed schematic of the equalizer arrangement illustrated in simple block form in the receiving system of Fig. 1B.
Figure 5:
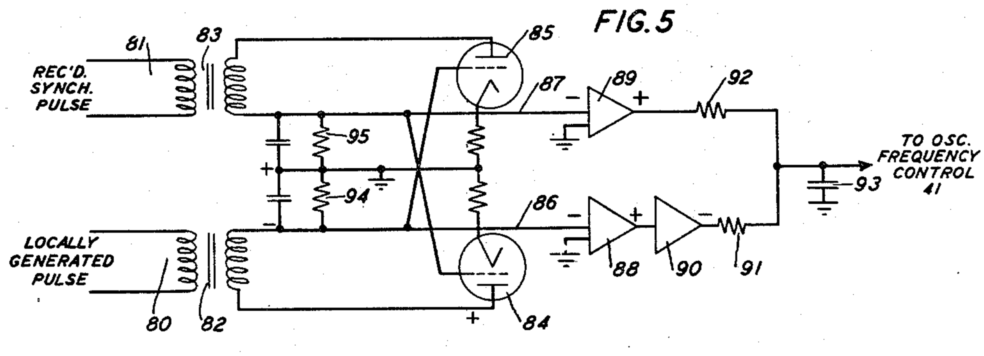
Figure 6:
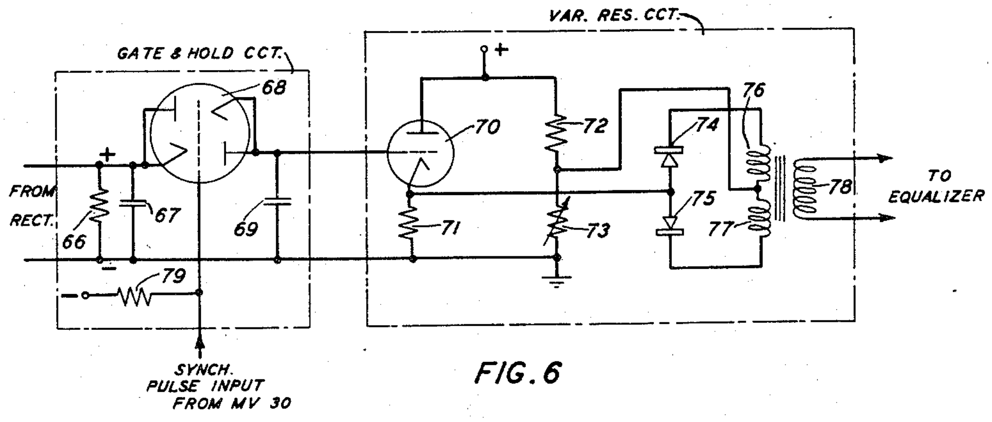

Fig. 5 shows the pulse comparison circuit used to derive a control potential from the synchronizing pulses which may be used to adjust the frequency of the local oscillator at the receiving terminal of the system; and Fig. 6 shows the details of one of the gating and hold circuits and variable resistance circuits indicated in block form in Fig. 2 for controlling the frequency equalization of selective fading distortion.

Figures 1A, 3, 4:
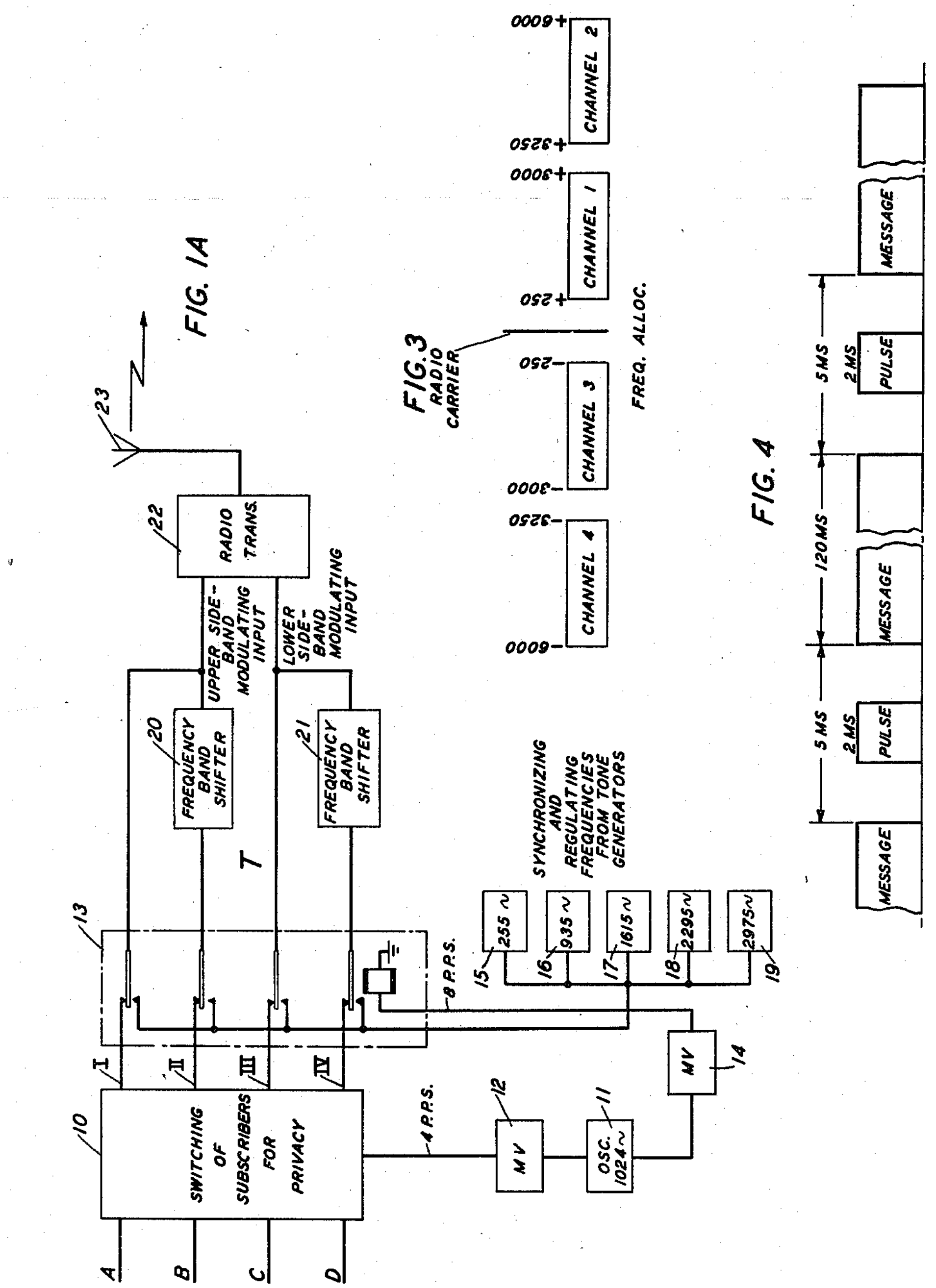
Fig. 1A shows the transmitting end or terminal of a communication system in accordance with the invention.
Fig. 3 illustrates the frequency space that may be occupied by a four-channel system in accordance with this invention and the relative positions of the several channels with respect to the carrier wave.
Fig. 4 illustrates the timing of the synchronizing and equalizing pulse in the interruption periods or "windows" in the message transmission.
Figure 1B:
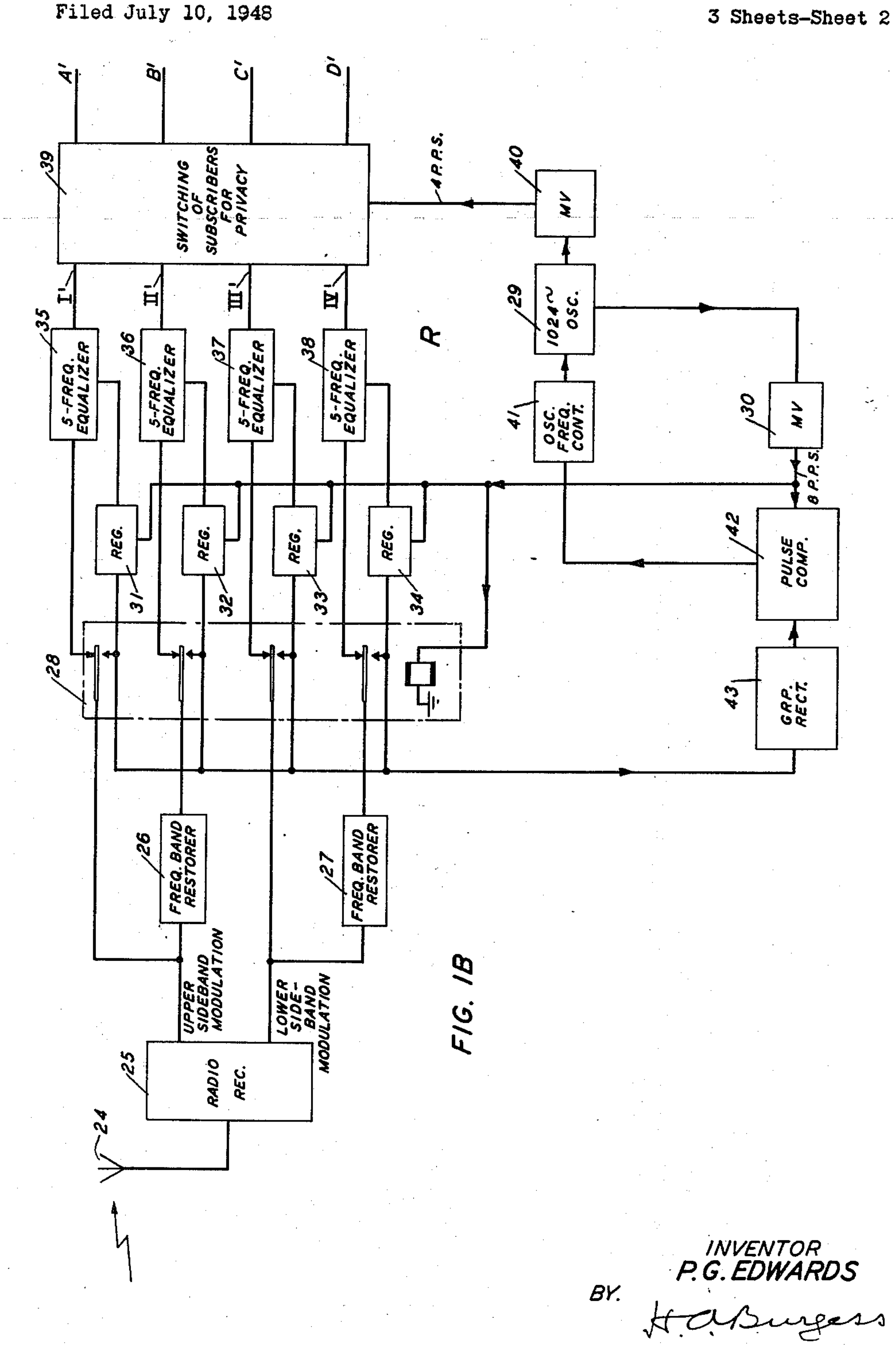
Fig. 1B shows the receiving end or terminal of the communication system in accordance with the invention.

Figs. 1A and 1B together constitute a multichannel communication system providing one-way transmission with privacy between a plurality of message circuits A, B, C, D at the transmitting end or terminal T (Fig. 1A) and a like plurality of message circuits A', B', C', D' at the receiving end or terminal R (Fig. 1B). The message circuits A, B, C, D may be connected with suitable sources of speech or other message intelligence signal waves, for example, telephone stations or subscribers in a conventional telephone system. The message circuits A', B', C', D' likewise may be connected with suitable receivers of speech or other message intelligence signal waves, for example, telephone stations or subscribers in a conventional telephone system. At the transmitting terminal at any one time, there may be message signal waves present in each of the message circuits for simultaneous transmission to the corresponding primed-letter message circuits at the receiving terminal. Although for an understanding of the invention a detailed description of a one-way transmission system only is necessary, it will be understood that transmission in the reverse direction may be readily provided for by including at the R terminal, transmitting terminal means such as are shown in Fig. 1A, and by including at the T terminal, receiving terminal means such as are shown in Fig. 1B, transmission in such reverse direction being on a different radio frequency or carrier wave, or on the same radio frequency or carrier wave with appropriate provisions for transmission alternately in the two directions, and for preventing singing around the transmission path, all in accordance with known two-way radiofrequency transmission practices.

For the purposes of this disclosure, the message circuits A, B, C, D, constitute sources of message frequency bands that fall within the limits of the same bandwidth, for example, 250 to 3000 cycles per second; the message circuits are continuously switched by means of any suitable switching arrangement or circuit 10, in accordance with a preassigned switching program, and under control of means to be described in detail hereinafter, among a like plurality of transmission paths, I, II, III, IV after having some or all of the respective message frequency bands inverted in their frequency disposition; two of such switched message frequency bands are shifted in the frequency spectrum by any suitable frequency shifting means 20, 21; and such inverted and shifted message frequency bands are suitably modulated on a radio frequency or carrier wave in the transmitter 22 to produce a pair of upper sideband products of modulation and a pair of lower sideband products of modulation that are radiated into the transmission medium from a suitable antenna 23. At the receiving terminal, the signal radiated from antenna 23 is picked up by the antenna 24, demodulated in the radio receiver 25 to provide the inverted and shifted message bands, two of which are reshifted or restored in suitable frequency restoring circuits 26, 27. The derived message bands are subjected to appropriate equalization or compensation in equalizers 35, 36, 37, 38 for selective fading effects that may be present in the radio frequency transmission medium, as will be explained in greater detail hereinafter, and delivered over paths I', II', III', IV' to the message circuits A', B', C', D' through any suitable switching arrangement or circuit 39 wherein the interconnections between the paths I', II' . . . and the circuits A', B' . . . are continuously switched in accordance with a preassigned switching program related to that of the circuit 10 at the transmitting terminal, and under control of means synchronized with the switching circuit control means at the transmitting terminal to be explained in greater detail hereinafter, whereby the message signals derived from the circuits A, B, C, D and continuously scrambled for privacy purposes at the transmitting terminal are correspondingly unscrambled at the receiving terminal and delivered to respective circuits A', B', C', D'. Accurate synchronization in the switching operations of the terminals of the system is necessary, and means shown in the drawings but not yet described are provided for such purpose. Because of selective fading effects that may be and usually are present in a radio frequency transmission medium, for example, such as are encountered in transoceanic radiotelephony, the invention is also directed to the provision of suitable means to correct for such selective fading. These synchronization and equalization features will now be treated in detail.

The transmitting end arrangement shown in Fig. 1A indicates four message circuits A, B, C, D connected to the privacy switching circuit 10 wherein the circuits are switched among the four paths I, II, III, IV in accordance with a predetermined or preassigned sequence or program at a suitable rate under control of pulses of the same frequency derived from a local oscillator or periodic element 11 through a multivibrator 12. This rate may be of the order of four times a second, and the oscillator may have an output of the order of 1024 cycles per second. The paths I . . . IV pass through an interruption arrangement, such as the multiple contacts of a relay 13, where they are interrupted at a selected rate, for example eight times a second, under control of pulses of the same frequency derived from oscillator 11 through a multivibrator 14. The open circuit or interruption interval or period, for the paths I . . . IV, is of a suitable brief duration, and may be chosen equal, for example to five milliseconds by selecting the proper time constant for the relay or other interrupter. During this interruption period, a pulse group comprising a plurality of separated frequencies or tones, preferably of equal amplitude and comprising frequencies spaced out over the speech or other message intelligence band, is derived from a plurality of local oscillators 15 . . . 19, and is transmitted into the radio transmitter over all paths I . . . IV simultaneously for a selected interval, which may be of the order of two milliseconds, through the lower contacts of the relay's multiple contacts. The position of this two-millisecond pulse in the five-millisecond interruption period is shown in Fig. 4. The pulse frequencies may, as indicated on Fig. 1A, be spaced at intervals in the frequency band desired or required to be transmitted, and, specifically, be of 255, 935, 1615, 2295 and 2975 cycles per second, respectively.

The multitone or multifrequency pulse group serves two functions; (1) to synchronize the control oscillators 11, 29 of the transmitting and receiving terminals, respectively, and, hence, the privacy switching at the receiving end of the system with that at the transmitting end of the system; and (2) to provide pilot frequencies or tones which will be affected by the fading conditions of the radio transmission path or medium, and, hence, furnish information to the receiving end on the basis of which correction of selective fading may be accomplished. Since each individual message circuit A, B, C, D and paths I, II, III, IV may contain frequencies from 250 to 3000 cycles per second, two of the message bands are shifted upwards in frequency position to prevent them from interfering with one another. The band or frequency shifters 20 and 21 may each comprise an oscillator, a modulator and associated filters for modulating the incoming message bands from the 250–3000 cycle per second range to the 3250–6000 cycle per second range. The message bands of paths II, IV are shifted in this manner, and those of paths I, III are not so shifted.

For the purposes of this disclosure, the transmitter 22 may be considered as operating on a 12-kilocycle bandwidth and providing an upper and a lower sideband each 6 kilocycles in width. Each of these sidebands may be divided into two channels for radio transmission purposes, providing four channels in all, each of which occupies a 2750-cycle bandwidth. Suitable modulation and filtering means are incorporated in the transmitter for modulating a carrier wave of suitable frequency with the input from message paths I and II, the latter of which has been shifted to the 3250–6000 cycle per second range, to produce an upper sideband and to suppress the lower sideband resulting from this modulation. This results in the message bands of paths I and II being shifted in frequency to the frequency ranges of 250–3000 cycles per second above the carrier frequency and 3250–6000 cycles per second above the carrier frequency respectively, to occupy radio channels 1 and 2, respectively. Similar modulating and filtering equipment is incorporated in the transmitter to modulate the carrier wave with the input from message paths III and IV, the latter of which has been shifted to the 3250–6000 cycle per second range. In this case the lower sideband resulting from the modulation is selected and the upper sideband suppressed. This results in the shifting of the message bands in paths III and IV to the frequency ranges of 250–3000 and 3250–6000 cycles per second, respectively, below the carrier frequency, to occupy radio channels 3 and 4. The relations among the channel frequencies and the carrier frequency are shown in Fig. 3.

Referring now to Fig. 1B, which shows the receiving end of the system, the transmitted radio frequency signals are picked up by antenna 24 and demodulated in radio receiver 25. This demodulation or detection provides the two message bands derived from paths I, II and modulated on the carrier wave at the transmitting end for transmission on radio channels 1, 2, and the two message bands derived from paths III, IV and modulated on the carrier wave at the transmitting end for transmission on radio channels 3, 4. Since the message bands transmitted over channels 2, 4 are in the frequency range from 3250 to 6000 cycles, it is necessary that they be converted back to their original frequency range of from 250 to 3000 cycles. This is accomplished by band frequency shifters or restorers 26, 27 each of which may comprise an oscillator, demodulator and associated filter to demodulate the respective band down to the desired frequency range. The message bands thus derived from the receiver 25 are transmitted through a suitable interruption means, such as multiple contact relay 28, in the paths I', II', III', IV'. The paths I' . . . IV' are interrupted substantially in synchronism with the interruptions of the interrupter means 13 at the transmitting terminal and for a period or interval somewhat longer than that at the transmitting terminal. The interruption rate at the receiving terminal will be eight times a second, and each interruption interval may be for a longer interval than at the transmitting terminal, for example, seven milliseconds beginning one millisecond before and ending one millisecond after the five-millisecond interruption interval at the transmitting end. This is accomplished under control of pulses having a frequency of eight pulses per second obtained from oscillator or periodic element 29 through a multivibrator 30. The time interval of seven milliseconds may be obtained by appropriate selection of the operate and release time characteristics of the device 28, and is chosen longer than the five-millisecond interruption at the transmitting end to allow operational tolerance, to take care of slight variations in the timing and duration of the interruption intervals at the transmitting and receiving terminals, to prevent message bands received over multiple propagation paths in the transmission medium from interfering with the control pulse, and to prevent the control tones received over multiple propagation paths in the transmission medium from appearing in the message bands. During the interruption time, the channels are switched to regulators 31 . . . 34, associated with five-frequency equalizers 35 . . . 38 which will adjust the equalization or compensation over the message band of each path I′ . . . IV′ eight times a second under control of pulses of that frequency derived from multivibrator 30 in accordance with the instantaneous selective fading conditions of the channel. The details of this equalizer arrangement will be described below in connection with the description of Fig. 2.

By analyzing the multitone pulse received over each radio channel, to determine the relative amplitudes of each tone, which is a measure of the instantaneous selective fading condition of the respective radio channel during the time of transmission of the pulse, and then varying the regulator for each pilot tone or frequency in accordance with the received level for that frequency, each message band is equalized for selective fading and the message bands respective to paths I′, II′, III′, IV′ entering the privacy switching circuit 39 are substantially free from selective fading frequency distortion.

In the switching circuit 39, the message bands delivered thereto from the paths I′ . . . IV′ are so switched that the message originating at message circuits A, B, C, D are transmitted to message circuits A′, B′, C′, D′, respectively. That is, the switching at the receiving end is in the same sequence with that which occurred at the transmitting end and in synchronism with it. This switching at the receiving end occurs at the switching rate of the transmitting terminal, namely, at the rate of four times a second, under control of pulses of the same frequency derived from oscillator 29 through a multivibrator 40. In order to keep the privacy switching at the receiving end synchronized with that at the transmitting end, it is necessary that the frequency of the oscillator 29, from which the switching pulses are derived, be maintained substantially equal to the frequency of the oscillator at the transmitting end of the system. To accomplish this synchronization, oscillator 29 is provided with a frequency control means 41, which may be a reactance tube connected across the resonant circuit for changing the resonant frequency, or may be a marginal relay for switching, for example, a suitable value of condenser across the resonant frequency determining circuit, depending on whether the oscillator is oscillating at too high or too low a frequency. The control potential for the frequency control means 41 is derived from a pulse comparison circuit 42 which utilizes a modification of the pulse comparison circuit described in United States Patent No. 2,406,014, August 20, 1946, W. R. Harry.

The circuit 42, shown in Fig. 5, has two separate pulse input circuits 80 and 81 which are coupled through the transformers 82, 83 to the cross-acting switching tubes 84, 85 which complete the circuits to the respective output circuits 86, 87. The pulse outputs are amplified in amplifiers 88, 89, and the output of amplifier 88 is inverted in phase by amplifier 90. Combining resistors 91, 92 couple the amplifiers 89, 90 to an integrating condenser 93. The operation of the circuit will now be described. The polarities of the input pulses to circuits 80 and 81 are chosen such that when the pulses are transferred to the switching tubes 84 and 85, the plates of the tubes are always positive with respect to their cathodes. The input pulses to circuits 80 and 81, respectively, are the locally generated pulses and the received synchronizing pulses. If a particular locally generated pulse is initiated before the received synchronizing pulse, a positive voltage will appear on the plate of tube 84. This causes a drop in potential across resistor 94 of the indicated polarity which produces a negative voltage at output circuit 86. At the same time, this negative output pulse is applied over an obvious path to the grid of tube 85 which becomes blocked and will not pass the subsequently received synchronizing pulse. There will, therefore, be no output voltage at output circuit 87. If, on the other hand, a received synchronizing pulse arrives before the corresponding locally generated pulse, a negative output pulse will appear at output circuit 87 and no output will appear at output circuit 86. Each of such outputs is amplified by amplifiers 88, 89, and since it is desired to differentiate between voltages at the outputs 86, 87, the output of amplifier 88 is passed through a second amplifier 90 which reverses the phase of its input voltage from amplifier 88. As a result, an output derived from the received synchronizing input pulses is of positive polarity while an output derived from the locally generated input pulses is of negative polarity. Such pulses of opposite polarity are passed through the isolating resistors 91 and 92, which serve to prevent interaction between the amplifiers 89 and 90, and integrated in condenser 93. With this arrangement, the voltage across the condenser will be positive or negative and of variable magnitude depending on whether the received synchronizing pulses arrive before or after the time of initiation of the locally generated pulses and depending upon the number of consecutive pulses of a given polarity. That is to say, each pulse either adds to or substracts from the total charge on condenser 93 so that the condenser's potential will depend in polarity and magnitude upon the relative synchronization of the received synchronizing pulses and the locally generated pulses. This potential may then be used to control the frequency of the oscillator 29 by means of the frequency control 41. The latter may be a variable reactance tube, included in the resonant circuit of the oscillator 29, which will vary in reactance in response to variations in potential on condenser 93. Hence, the frequency of the oscillator 29 is adjusted or varied until the pulses derived from it occur at substantially the same time as the received synchronizing pulses. When this occurs, the oscillator 29 will be in substantial synchronism with the oscillator 11. If it is found that it is unnecessary to maintain a very high degree of synchronization between the transmitting and receiving terminal oscillators, the reactance tube may be replaced with a simple marginal relay arrangement with associated fixed condensers of selected capacity, whereby the different condensers would be suitably switched in the resonant circuit in order to adjust the frequency of the oscillator 29 in discrete frequency steps.

With reference now to Fig. 2, the equalizer arrangement will be explained in greater detail. The showing of Fig. 2 corresponds to the equalizer arrangement for any one of the channels, where the filters 45 . . . 49, rectifiers 50 . . . 54, gate and holding circuits 55 . . . 59, and variable resistances 60 . . . 64 are all included in Fig. 1B in each of the boxes designated 31 . . . 34, and the equalizer 65 corresponds to each of the equalizers of Fig. 1B designated as 35, 36, 37 and 38. The interrupter or contact set 44 corresponds to one of the multiple contacts of the interrupter arrangement or relay 28 in Fig. 1B. During the seven-millisecond period referred to above, the upper contact of contact set 44 is opened and the lower contact is closed so that the output of the receiver 25 for the particular channel is connected to the group of band filters 45 . . . 49 which are tuned to the frequencies of the transmitted control tones; that is, to 255, 935, 1615, 2295 and 2975 cycles per second. These individual selected tones are then rectified by rectifiers 50 . . . 54, each of which provides a direct current potential proportional to the amplitude of the respective pilot tone frequency to which the associated filter is tuned. Therefore, there are obtained five direct current potentials; each indicative of the relative amplitudes of the received pilot tones or frequencies. These direct currents are each passed through a separate gate and holding circuit 55 . . . 59. The way in which these direct current potentials are utilized to accomplish the required equalization will be readily understood by reference to Fig. 6 which will now be described.

Fig. 6 shows the details of any one of the gate and holding circuits 55 . . . 59 and its associated variable resistance device 60 . . . 64 shown in Fig. 2. The voltage from the rectifier 50 . . . 54 of Fig. 2 is developed across the parallel combination of resistor 66 shunted by condenser 67 selected to provide the desired time constant. This voltage is positive with respect to ground and is applied to the gate and holding tube 68, which comprises two triodes connected back to back to provide conduction for both positive and negative voltages through to condenser 69. Tube 68 is enabled, during the time an equalization pulse is being received, by the positive synchronized pulse applied to the grids from the multivibrator 30. This causes the tube to conduct. As a result, the voltage across the resistor 66 is transferred to the condenser 69. This voltage is then applied to the grid of tube 70 which provides a definite plate-to-cathode impedance corresponding to a particular grid voltage. The bridge circuit comprising tube 70, resistors 71, 72, and variable resistor 73, having previously been balanced at some particular nominal value of impedance for tube 70, is proportionately unbalanced depending upon the voltage applied to the grid of tube 70. This unbalance causes current to flow from the positive potential source connected to the plate of tube 70 through the elements of the bridge circuit and through the varistor elements 74, 75 and transformer windings 76, 77. This current flow through the varistors 74, 75 causes a change in the resistance of the varistors which change is reflected through the windings 76, 77 to the winding 78 of the transformer. This effective resistance is utilized in the equalizer to adjust the amount of equalization accordingly. At the end of the pulse, the synchronizing pulse magnitude is insufficient to overcome the negative bias applied to the grids through resistor 79, and the tube 68 is cut off. That is, its impedance becomes very high, and since there is no means for the charge on condenser 69 to leak off, the bias on tube 70 remains constant between pulses and, hence, the equalization remains fixed during the time interval between regulating pulses. If it is assumed, now, that the next pulse when rectified develops a voltage across resistor 66 which is less than that which is left on condenser 69 from the previous pulse, current will flow out of condenser 69 through tube 68 and the voltage on the condenser 69 will be reduced to the lower value now developed across resistor 66. This will result in a change in impedance of tube 70, and a resultant change in the varistor impedance, which will change the equalization accordingly. This process may be repeated over and over again as the selective fading conditions change and different equalization is required. In the event that there has been no change in the selective fading conditions, the voltage conditions in the circuit will remain fixed and consequently the equilaztion will remain unchanged. Each channel is therefore equalized at five frequencies spaced throughout the speech band and selective fading is substantially eliminated.

Thus it is seen that the functions of both selective fading equalization and privacy switching synchronization are accomplished in a manner which requires no additional frequency spectrum than that which is required for a standard four-channel communication system, and because of the short pulse interruption time, the equalization and synchronization is accomplished without any noticeable interference with the transmitted intelligence.

Although the description given herein is based on a four-channel system it will be evident that the same principles and methods may readily be applied to a system involving any number of channels. Likewise, it is not necessary that both privacy switching and selective fading equalization be carried on by this means. The method of selective fading equalization is applicable to even a single channel system where no switching is involved and, similarly, the method of privacy switching synchronization may be used without any selective fading equalization. It is to be understood that the present invention is not limited to the particular arrangements illustrated. It may be found desirable to change the length of the interruption period, or of the pulse, or its frequency to take care of special operating conditions. Similarly, it may be desired to use more or less than five equalization frequencies depending on special circumstances. All these variations are contemplated as within the scope of the invention herein described.

What is claimed is:

1. A signaling system comprising signal transmitting means and signal receiving means, including means providing a plurality of transmission channels, a plurality of signal originating circuits and a plurality of signal receiving circuits each equal in number to the number of transmission channels, switching means under control of a periodic element at the transmitting means to switch said signal originating circuits in a preassigned manner among said transmission channels, and switching means under control of a periodic element at the receiving means to switch said signal receiving circuits among said channels in the same preassigned manner, and means to synchronize said periodic elements controlling said switching to maintain a preassigned correlation between any particular signal originating circuit and a respective signal receiving circuit; said synchronizing means comprising means for interrupting said transmission channels for a selected time interval, means for transmitting a pulse over each of said transmission channels within such time interval and under control of the periodic element at the transmitting means, and means at the receiving means for comparing the time of inception of said transmitted pulse with the time of inception of a pulse generated at the receiving means and for deriving a control indication for adjustment of the periodic element at the receiving means to synchronism with the periodic element at the transmitting means.

2. A signaling system as claimed in claim 1 wherein said transmitted pulse includes a plurality of frequencies at spaced frequency intervals in the signal frequency band to minimize the possibility of loss of a synchronizing pulse because of selective fading in the transmission medium between the transmitting and receiving means of the system.

3. A signaling system as claimed in claim 2 including means to analyze the transmitted pulse to determine the relative amplitudes of the component frequencies, and equalizer means respective to each channel responsive to the variation in amplitudes of the component frequencies for substantially compensating for the selective fading frequency distortion effect in the respective channels.

4. A signaling system as claimed in claim 3 wherein the equalizer means comprises means for enabling the analyzing means during the pulse intervals only, and for disabling said analyzing means at other times, and means for blocking the equalizer control at the end of the pulse interval.

5. A signaling system comprising a plurality of channels for transmission of a like plurality of message bands between a transmitting terminal and a receiving terminal, means for interrupting all of said channels at the transmitting terminal for a selected time interval, means for transmitting within said time interval on all channels simultaneously a pulse comprising a group of frequencies located at spaced intervals in each message band, means for interrupting said channels at the receiving terminal in synchronism with the interruptions at the transmitting terminal, means for analyzing the relative amplitudes of the received pulse group of frequencies to determine the instantaneous selective frequency fading conditions of the system, and means for equalizing the channels at the receiving terminal in accordance with the said analysis to compensate for the effect of selective frequency fading during transmission between said transmitting and receiving terminals.

6. A signaling system comprising a plurality of channels for a like plurality of message bands for simultaneous transmission between a transmitting terminal and a receiving terminal, means for periodically interrupting all of said channels simultaneously at the transmitting terminal for a selected time interval, means for transmitting within said time interval on all channels simultaneously a pulse comprising a plurality of equal amplitude audio frequencies located at spaced intervals in each message band, means for interrupting said channels at the receiving terminal in synchronism with the interruptions at the transmitting terminal, means at the receiving terminal for determining the relative amplitudes of the frequencies of the received pulse, and means for equalizing the channels at the receiving terminal in accordance with such determination, for the effect of selective frequency fading on transmission in said channels during transmission between said transmitting and receiving terminals.

7. A communication system comprising a transmitting terminal and a receiving terminal, a plurality of message frequency band circuits at the transmitting terminal and a corresponding plurality of message frequency band circuits at the receiving terminals, means at the transmitting terminal for shifting selected message frequency bands to different frequency bands and means at the receiving terminal to restore said shifted bands to their respective original frequency disposition, radio frequency means at the transmitting terminal for transmitting said plurality of message frequency bands on a corresponding plurality of radio frequency channels and radio frequency means at said receiving terminal for deriving the transmitted message bands from said radio frequency channels, switching means under control of a periodic element at the transmitting terminal to switch said message band circuits in preassigned manner among said transmission channels, and switching means under control of a second periodic element at the receiving terminal for switching said transmission channels among the message band circuits at the receiving terminal in synchronism with the switching at the transmitting terminals, and means to synchronize said periodic elements thereby to maintain the correlation between the respective transmitting and receiving message circuits; said synchronizing means comprising means for periodically interrupting said transmission channels for a selected time interval, means for transmitting a pulse over said channels simultaneously within each such interval and under control of the periodic element at the transmitting terminal, and means at the receiving terminal for comparing the time of inception of said transmitted pulse with the time of inception of a pulse generated at the receiving terminal under control of the periodic element thereat, and deriving a difference indication for adjustment of the latter periodic element to synchronism with the transmitting terminal periodic element.

8. A system as claimed in claim 7 in which said transmitted pulse comprises a plurality of frequencies at spaced frequency intervals in the message frequency band.

9. A system as claimed in claim 7 in which the transmitted pulse comprises a plurality of equal amplitude frequencies at spaced frequency intervals in the message frequency band.

10. A system as claimed in claim 7 in which the transmitted pulse comprises a plurality of equal amplitude frequencies at spaced frequency intervals in the message frequency band, and which includes means at the receiving terminal to determine the relative amplitudes of the frequencies of the pulse as received at the receiving terminal, and means respective to each transmission channel and responsive to variation in amplitudes of the pulse frequencies for substantially eliminating the effects of selective fading frequency distortion in the respective channels.

PAUL G. EDWARDS.

REFERENCES CITED

The following references are of record in the file of this patent:

UNITED STATES PATENTS

| Number | Name | Date |
|---|---|---|
| 2,102,138 | Strieby | Dec. 14, 1937 |
| 2,379,744 | Pfleger | July 3, 1945 |
| 2,407,259 | Dickieson | Sept. 10, 1946 |
| 2,465,531 | Green | Mar. 29, 1949 |